Patented Jan. 27, 1948

2,435,013

UNITED STATES PATENT OFFICE 2,435,013

3-THIOETHERS OF ANDROSTENE-3-ONE-17-OLS AND PROCESS OF MAKING SAME

Karl Miescher, Riehen, Switzerland, assignor to Ciba Pharmaceutical Products, Incorporated, Summit, N. J., a corporation No Drawing. Application July 1, 1942, Serial No. 449,343. In Switzerland January 16, 1941

Section 1, Public Law 690, August 8, 1946
Patent expires January 16, 1961

10 Claims. (Cl. 260—397.5)

It is known that saturated or unsaturated androstanolones which are substituted in the 17-position and their derivatives with a keto group in the 3-position can be obtained by treatment of corresponding 3:17-dihydroxy compounds with oxidizing agents. In many cases, however, such a final oxidation has proved to be unsatisfactory. According to patent application Serial No. 306,184 filed November 25, 1939, now Patent No. 2,344,997, dated March 28, 1944, it was found that this operation could be avoided if metallo-organic compounds, for example of the Grignard type or acetylenides, were allowed to react on 3-enolates or 3-acetals of saturated and unsaturated androstandiones and, if required, the derivatives thus obtained were treated with hydrolyzing agents.

Further experiments have now shown that it is advantageous to make use of the corresponding thio-derivatives—the thio-enolates or thio-acetals (mercaptols)—in place of the enolates or acetals in the latter process, that is to say, it has been found that the splitting of the enol or acetal compounds—even if occurring to a small extent—is practically completely avoided by making use of these thio-derivatives.

As parent materials, use may be made of thio-compounds, i. e. thioenol ethers or mercaptols, derived from saturated or unsaturated androstanediones or their derivatives, which can contain alkyl, such as methyl or ethyl, alkylene, such as ethylene or trimethylene, or even cycloalkyl, aralkyl or aryl radicals, for example, a benzene radical. The preparation of the parent substances from the free ketones takes place in a manner of itself known, for example, by the action of the corresponding mercaptans in the presence of anhydrous acid agents.

Suitable metallo-organic compounds are, for example, the alkali or heavy metal salts of acetylene or its mono-substituted derivatives, aryl-, aralkyl- and alkyl-alkali compounds, organo-magnesium compounds, such as methyl-, ethyl-, allyl-, aralkyl- or aryl-magnesium halides, acetylene magnesium halides, zinc-alkyl-compounds, etc.

The thio-derivatives thus obtained may be decomposed, if desired, to the free ketones in a manner of itself known, for example, by means of mineral acids, acid anhydrides, cadmium carbonate and mercury salts and the like.

The following examples illustrate the invention:

Example 1

2.9 grams of 3-ethyl-thioenol ether of Δ⁴-androstene-3:17-dione (obtained, for example, by heating a mixture of androstenedione and ethyl mercaptan in the presence of paratoluene sulfonic acid, removal of the water formed by the reaction by distillation with benzene as an azeotropic mixture, extraction with ether, shaking with aqueous potash solution followed by dilute caustic soda solution, drying and evaporation, recrystallization from an ether-pentane mixture) are dissolved in 55 ccs. of ether. To this solution is added a solution of acetylene monomagnesium bromide in ether, prepared by introducing acetylene into an ethereal solution of 15 gms. of ethyl-magnesium bromide, and the reaction mixture is boiled for some time. When the reaction is complete, the mixture is cooled strongly and sparingly soluble bimolecular compounds which may have been formed are removed by filtration. To this filtrate is added an aqueous solution of ammonium chloride; the ethereal layer is removed, dried and evaporated. In this way, a residue consisting of the 3-ethyl-thioenol ether of 17-ethinyl-testosterone is obtained; this may be converted into the known 17-ethinyl-testosterone by acid decomposition, for example, by means of mineral acids.

In place of the 3-ethyl-thioenol ether of Δ⁴-androstene-3:17-dione, other thioenol ethers, such as methyl-, ethylene- or benzyl-thioenol ethers, may be used as parent substances. The corresponding mercaptols may also be used as starting materials for the reaction.

Other unsaturated radicals, for example, the allyl radical, may be introduced in place of the acetylene radical in an analogous manner.

If 3-thio-derivatives of androstandione be used as parent substances, the corresponding 17-substituted dihydro-testosterones may be obtained.

Example 2

A solution of 2.9 grams of androstenedione-3-ethylene mercaptol in toluene is dropped into an ethereal solution of 3.6 grams of methyl magnesium bromide. (The mercaptol may be obtained, for example, by allowing androstenedione to stand with ethylene mercaptan in the presence of dry hydrogen chloride, diluting the reaction mixture with much ether, treatment of the solution with aqueous potash solution in the presence of ice followed by dilute caustic soda solution and ice, drying the ethereal solution with sodium sulphate, evaporation of dryness, chromatographing the residue with aluminum oxide, and recrystallization from ether.) The reaction mixture is then boiled for a time, after which it is worked up as described in Example 1. In this manner, the 3-ethylene mercaptol of 17-methyl-testosterone is obtained. To eliminate the mercaptol radical, 0.1 gram of the mercaptol is dissolved in 20 ccs. of acetone, a solution of 0.3 gram of sublimate in 200 ccs. of acetone is added together with 0.5 gram of freshly precipitated cadmium carbonate, and the reaction mixture is boiled for 3 to 4 hours under reflux. It is then filtered, the filter being washed with acetone, and the filtrate is evaporated to dryness in vacuo. Water is added to the residue and the solution is extracted with ether. In order to remove any sublimate that has been transferred to the ethereal solution, the latter is washed several times with sodium carbonate, followed by water. After drying and evaporating the free 17-methyl-testosterone is obtained.

Other alkyl groups, such as the ethyl radical, may be introduced in place of the methyl radical.

In a similar manner, for example, 17-methyl-dihydro-testosterone may be obtained, in which case, for example, other polymethylene mercaptols or diethyl- or dimethyl-mercaptol may be used as parent substance in place of ethylene mercaptol. In each case, small quantities of the alcohols, epimeric in the 17-position, may be obtained from the mother liquor.

*Example 3*

2.4 grams of potassium are dissolved in 50 ccs. of amylene hydrate; to this solution a benzene solution of 2.6 grams of androstenedione-3-ethyl-thioenol ether is added and acetylene is introduced whilst cooling. When the reaction is ended, the reaction mixture is worked up in the usual manner. In this way, the 3-ethyl-thioenol ether of 17-ethinyl-testosterone is obtained. By eliminating the mercaptol bond in a manner of itself known, the known 17-ethinyl-testosterone may be obtained.

The condensation may be carried out, for example, by means of an alkali metal dissolved in liquid ammonia instead of by means of potassium in the presence of amylene hydrate.

What I claim is:

1. In a process for the manufacture of a member of the group consisting of the 3-thioenol ethers and 3-thioacetals of the saturated and unsaturated androstane-3-one-17-ols containing a hydrocarbon radical in 17-position, the step of reacting a metallo-organic compound with a member of the group consisting of the 3-thioenol ethers and 3-thioacetals of the saturated and unsaturated androstandiones.

2. A process for the manufacture of a member of the group consisting of the 3-thioenol ethers and 3-thioacetals of the saturated and unsaturated androstane-3-one-17-ols containing a hydrocarbon radical in 17-position, which comprises reacting a metallo-organic compound with a member of the group consisting of the 3-thioenol ethers and 3-thioacetals of the saturated and unsaturated androstandiones, and then hydrolyzing the resultant thiocompound.

3. A process for the manufacture of a member of the group consisting of the 3-thioenol ethers and 3-thioacetals of the saturated and unsaturated androstane-3-one-17-ols containing hydrocarbon radical in 17-position, which comprises reacting a saturated metallo-organic compound with a member of the group consisting of the 3-thioenol ethers and 3-thioacetals of the saturated and unsaturated androstandiones, and then hydrolyzing the resultant thio-compound.

4. A process for the manufacture of a member of the group consisting of the 3-thioenol ethers and 3-thioacetals of the saturated and unsaturated androstane-3-one-17-ols containing hydrocarbon radical in 17-position, which comprises reacting an alkyl metallo-organic compound with a member of the group consisting of the 3-thioenol ethers and 3-thioacetals of the saturated and unsaturated androstandiones, and then hydrolyzing the resultant thio-compound.

5. A process for the manufacture of a member of the group consisting of the 3-thioenol ethers and 3-thioacetals of the saturated and unsaturated androstane-3-one-17-ols containing hydrocarbon radical in 17-position, which comprises reacting a methyl magnesium halide with a member of the group consisting of the 3-thioenol ethers and 3-thioacetals of the saturated and unsaturated androstandiones, and then hydrolyzing the resultant thio-compound.

6. A process for the manufacture of a member of the group consisting of the 3-thioenol ethers and 3-thioacetals of the saturated and unsaturated androstane-3-one-17-ols containing hydrocarbon radical in 17-position, which comprises reacting an unsaturated metallo-organic compound with a member of the group consisting of the 3-thioenol ethers and 3-thioacetals of the saturated and unsaturated androstandiones, and then hydrolyzing the resultant thio-compound.

7. A 3-thioenol ether of an androstene-3-one-17-ol which contains in the 17-position a member selected from the group consisting of saturated and unsaturated hydrocarbon radicals.

8. A 3-thioenol ether of an androstene-3-one-17-ol containing in 17-position an alkyl group.

9. A 3-thioenol ether of an androstene-3-one-17-ol containing in 17-position a methyl group.

10. A 3-thioenol ether of an androstene-3-one-17-ol containing in 17-position an ethinyl group.

KARL MIESCHER.

REFERENCES CITED

The following references are of record in the file of this patent:

UNITED STATES PATENTS

| Number | Name | Date |
|---|---|---|
| 2,294,433 | Westphal | Sept. 1, 1942 |

OTHER REFERENCES

Ruzicka, "Helv. Chim. Acta," vol. 18 (1935), pages 994–998, 1487–1498.

Certificate of Correction

Patent No. 2,435,013.                                                                            January 27, 1948.

KARL MIESCHER

It is hereby certified that errors appear in the printed specification of the above numbered patent requiring correction as follows: Column 3, line 9, for the words "of dryness" read *to dryness*; column 4, line 7, claim 2, for "thiocompound" read *thiocompound*; and that the said Letters Patent should be read with these corrections therein that the same may conform to the record of the case in the Patent Office.

Signed and sealed this 6th day of April, A. D. 1948.

[SEAL]

THOMAS F. MURPHY,
*Assistant Commissioner of Patents.*